United States Patent
Levin et al.

(10) Patent No.: US 12,037,196 B1
(45) Date of Patent: Jul. 16, 2024

(54) WAREHOUSES HAVING MULTIPLE STORAGE UNITS CONNECTED IN SERIES

(71) Applicant: 1MRobotics Ltd

(72) Inventors: Ido Levin, Rishon LeTsiyon (IL); Dor Hadad, Tel Aviv (IL); Itai Price, Tel Aviv (IL); Roee Tuval, Holon (IL); Eyal Yair, Bnei Darom (IL); Dafna Netzer, Ramat Gan (IL)

(73) Assignee: 1MROBOTICS LTD., Bnei Darom (IL)

( * ) Notice: Subject to any disclaimer, the term of this patent is extended or adjusted under 35 U.S.C. 154(b) by 0 days.

(21) Appl. No.: 18/231,807

(22) Filed: Aug. 9, 2023

(51) Int. Cl.
*B65G 1/04* (2006.01)
*B65G 1/137* (2006.01)

(52) U.S. Cl.
CPC ......... *B65G 1/1376* (2013.01); *B65G 1/0435* (2013.01); *B65G 1/0492* (2013.01); *B65G 2201/0267* (2013.01)

(58) Field of Classification Search
CPC ........ B65G 1/1375; B65G 1/10; B65G 1/133; B65G 1/0435; B65G 1/0492; G07F 11/165; G07F 17/12; G07F 11/004
See application file for complete search history.

(56) References Cited

U.S. PATENT DOCUMENTS

| | | | |
|---|---|---|---|
| 10,604,344 B2 * | 3/2020 | Testa | G07F 11/165 |
| 11,180,069 B2 * | 11/2021 | Jarvis | G06Q 10/08 |
| 2009/0074545 A1 * | 3/2009 | Lert, Jr. | B65G 1/1378 |
| | | | 414/267 |
| 2009/0149985 A1 * | 6/2009 | Chirnomas | G07F 11/26 |
| | | | 705/26.1 |
| 2017/0107055 A1 * | 4/2017 | Magens | B65G 1/1373 |
| 2018/0057263 A1 * | 3/2018 | Beer | B65G 1/0492 |
| 2019/0152702 A1 * | 5/2019 | Testa | B65G 1/1373 |
| 2021/0380341 A1 * | 12/2021 | Dugat | B25J 15/08 |
| 2023/0202047 A1 * | 6/2023 | Tuval | G07F 11/165 |
| | | | 705/332 |

* cited by examiner

*Primary Examiner* — Timothy R Waggoner
(74) *Attorney, Agent, or Firm* — AlphaPatent Associates Ltd.; Daniel J. Swirsky

(57) ABSTRACT

A system for storing goods system, including a main path configured to enable movement of a robot thereon, multiple storage devices containing goods to be delivered, where the multiple storage devices are connected in series in a direction substantially perpendicular to a longitudinal axis of the main path, where the robot carries storage devices along the main path, and where engagement of one storage device to another storage device is enabled by movement of the robot.

8 Claims, 9 Drawing Sheets

WAREHOUSES HAVING MULTIPLE STORAGE UNITS CONNECTED IN SERIES

FIELD

The invention relates generally to a warehouse having multiple storage units connected in series.

BACKGROUND

There is a growing need for delivery services, mainly in the on-demand space. Consumers require that the goods are provided within short time durations (SLAs), sometimes within an hour or two, or even less, from the request time. This requires companies to increase efforts in the "last mile", to be closer to the consumers' residences and offices, as opposed to having larger warehouses outside city centers, which was the standard in the past. Companies need sufficient geographic coverage in cities to supply the goods quickly.

The goods are manufactured in the factory, then transferred to a regional warehouse, and from the regional warehouse they are transported to the "last mile" facilities (close to the consumers). The facilities may be shops that also work with delivery services that provide the goods to the consumers, or enable the consumers to come to the shops and collect the goods.

When a delivery station is operated by a single collecting robot configured to collect items from storage units, the collecting robot can only collect the goods from the storage units accessible to the collecting robot. In addition, delivery stations have a limited number of storage units due to the size of the delivery station and due to the requirement of placing all the storage units at a limited distance from the collecting robot. The limitation to the number of storage units increases the number of loading new goods in the delivery station, hereby increasing the operational costs of the delivery station. There is a need to increase the number of storage units in a delivery station while using the same hardware, such as the same collecting robot and the same pallets.

SUMMARY

The invention, in embodiments thereof, provides a system for storing goods system, comprising a main path configured to enable movement of a robot thereon, multiple storage devices containing goods to be delivered, where the multiple storage devices are connected in series in a direction substantially perpendicular to a longitudinal axis of the main path, where the robot carries storage devices along the main path, where engagement of one storage device to another storage device is enabled by movement of the robot.

In some cases, the system further comprises a management unit for receiving orders for goods and a kiosk for outputting the goods in the order. In some cases, the system further comprises a push-pull device configured to carry a first storage device and move the first storage device relative to another storage device. In some cases, the multiple storage devices comprise a connecting mechanism configured to connect two storage devices to each other.

In some cases, the system further comprises a stopper configured to limit a sliding motion of a pallet on top of the station. In some cases, the system further comprises multiple pallet stations, each pallet station of the multiple pallet stations is located under a pallet of the multiple pallets, the pallet stations are configured to carry the pallet.

In some cases, the system further comprises an actuator configured to move a first pallet of the multiple pallet relative to a second pallet when connecting the first pallet to the second pallet. In some cases, the first pallet moves along a longitudinal axis of the main path. In some cases, the system further comprises a kiosk used by a user of the delivery station, the kiosk has an aperture that enables collecting the bag with the goods outside the housing.

BRIEF DESCRIPTION OF THE DRAWINGS

Some embodiments of the invention are herein described, by way of example only, concerning the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the Drawings.

DETAILED DESCRIPTION

Figure 1:
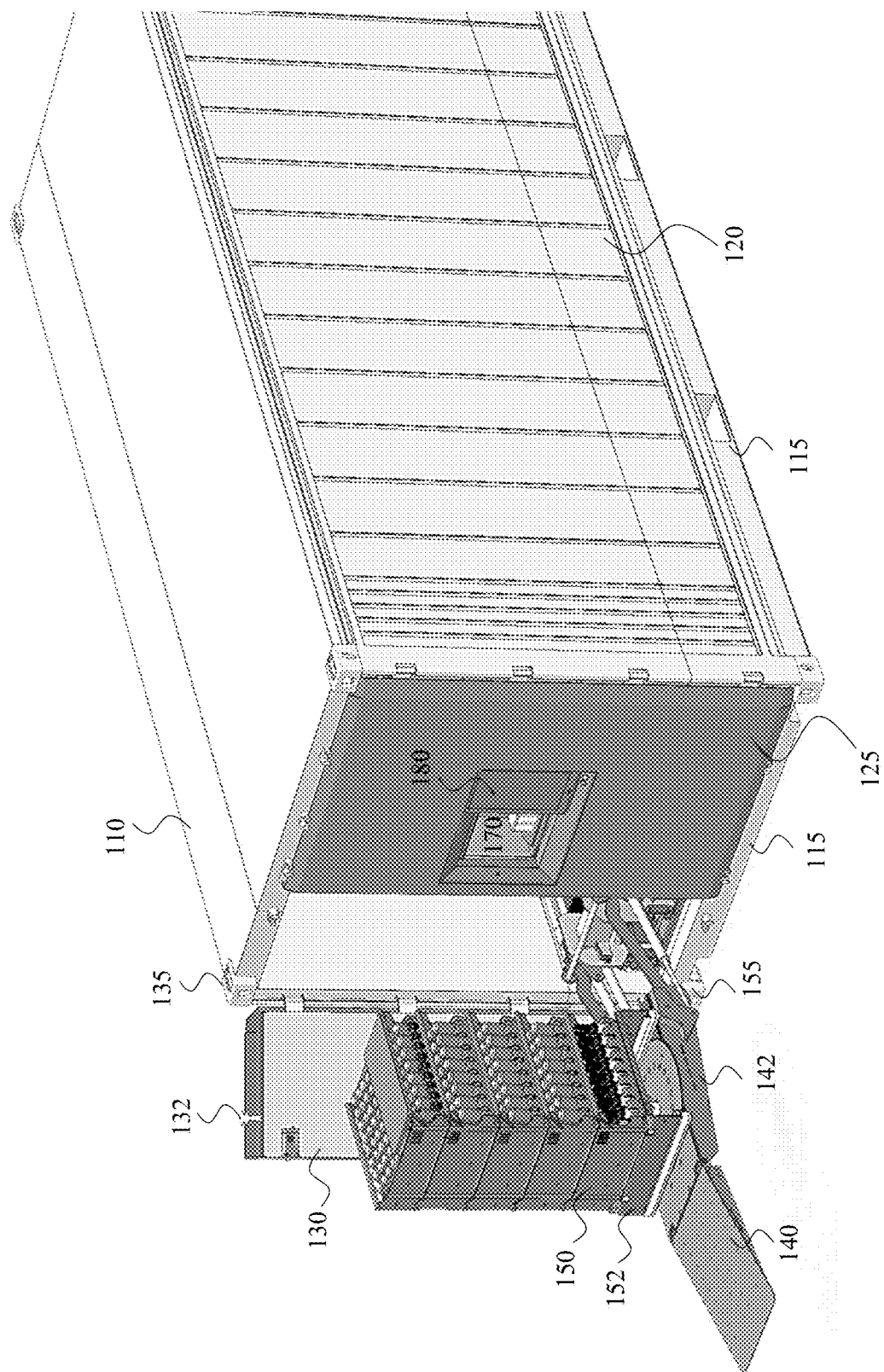
FIG. 1 shows an external view of the delivery station, according to an exemplary embodiment of the invention.

A technical challenge solved using the invention is to increase the storage density of goods stored in automated warehouses, that is to increase the amount of goods that can be stored in a given area.

The automated warehouse may be part of an organization's logistic center, a warehouse, a store, or an automated delivery station that functions as an autonomous store that outputs goods via a kiosk according to orders received at an order server. Embodiments of the invention described herein focus on a delivery station for simplicity only and can be used in any environment in which storage devices are loaded or unloaded via a track or another type of physical or virtual path on which a vehicle moves, and the vehicle carries the storage devices along the path to a desired station.

The technical solution provided by the invention is to provide a fully autonomous delivery station to dispense goods, for example to an end-user or to a delivery person. The delivery station comprises multiple lines of pallets connected in series, such that in each line, there is a single pallet accessible to the collector and the other pallets are located farther from the main path on which the collector moves. This way, the majority of the delivery station's volume is consumed by storage units that store goods and areas for robot access are kept to a minimum, increasing the number of goods stored in the delivery station in a given time stamp, enabling delivery of more orders between loading of goods. This increases the efficiency of the delivery station, as less human labor is required compared to the number of delivered items. For example, instead of sending a truck once every 1,000 deliveries, the operator of the delivery station can send a truck once every 5,000 deliveries. This also reduces real estate cost per amount of goods stored. This is enabled by connecting the pallets in series, and using a connecting and disconnecting mechanism without any actuator or power consumption at the pallet level, only on the robot that moves along the main path, which makes the pallets simpler and more cost-effective.

The delivery station comprises a housing. The housing may be configured to prevent unauthorized persons to access the goods, and/or keep the goods in desired conditions, for example, a desired temperature and humidity range. The housing may be secured to a surface, such as a floor, or pavement, for example using screws. The housing may comprise at least some of a group comprising a base, sidewalls extending upwards from the base, and a ceiling.

The term "goods" refers to items that satisfy human wants and provide utility, for example, to a consumer making a purchase of a satisfying product. The goods in the delivery station may be packed, for example in cans, bottles, plastic boxes, cardboard boxes, bags made of polymers such as polyethylene, and the like. The goods may be food products, beverages, electronic appliances, games, toys, clothes, and the like.

The term "storage devices" refers to an object in the housing that stores goods. The object may be a shelf, a container, a box, a pallet, and the like. The storage device may be a flat transport structure, which supports goods in a stable fashion while being lifted by another object, such as a forklift, a pallet jack, a front loader, a jacking device, or an erect crane. The storage devices may be secured to the body of the housing with strapping, stretch wrap or shrink wrap. The storage devices can also be made of plastic, metal, wood, paper, and other materials.

FIG. 1 shows an external view of the delivery station, according to an exemplary embodiment of the invention. The external view is defined as a view from outside the delivery station's housing. The housing comprises a base 115, sidewalls 120 extending from the base 115, and a ceiling 110. The shape of the base 115 may be rectangular, for example, to be easily carried on a truck/ship. In such a case, the housing may have four sidewalls extending from the four edges of the base 115. In some exemplary cases, the size and shape of the housing may be of an intermodal container, easily shipped using trucks, trains, and ships, and some mechanical and/or electrical components disclosed herein.

At least one of the sidewalls 120 enables loading goods into the delivery station and delivering goods from the delivery station. When delivering the goods, a kiosk 170 is opened. The kiosk 170 may be formed as a niche in one of the sidewalls 120. In the standard mode of operation, the kiosk 170 is closed, for example using a movable sheet. When there is a requirement to open the kiosk, for example, to deliver goods from the delivery station, the movable sheet is moved, for example sidewards, upwards, or downwards, enabling a person to access the goods. The goods may be placed on a surface inside the storage volume, such as a shelf located near the top end of the kiosk 170. In some cases, the movable sheet may move in response to a command from a management unit of the delivery station. The command may be issued after the person receiving the goods is identified, for example by scanning a code, exchanging signals from the person's cellular phone, and the like.

In some exemplary cases, the delivery station further comprises a user interface 180 coupled to one of the sidewalls 120. The user interface 180 enables users to interact with the management unit. Such interaction may include identification of persons, request of delivery, initiation of a loading process for loading goods into the housing 110 and the like.

In standard mode or operation, the housing is closed, to facilitate maintenance of desired conditions, such as light, temperature, humidity, and the like. When goods are to be loaded into the delivery station, a door 130 of front sidewall 125 of the sidewalls 120 may be opened, to collect the goods 150. In some cases, a door will be open on one of the sidewalls 120 to allow fast replenishing of the delivery station. The goods 150 may be provided on a storage devices such as pallet 152, or on another movable base configured to carry the goods 150.

In standard operation mode, the door 130 is closed, preventing access to the storage volume defined inside the housing and keeping the volume inside the housing 110 in desired conditions, for example in terms of temperature and humidity. In loading mode, the door is either automatically opened, for example by an actuator, or by a mechanism unlocking a lock that prevents the door 130 from moving. The door 130 may move outside from the housing, or inside, towards the storage volume.

When loading new goods into the delivery station, a command is received at the management unit to initiate a loading process. The loading process may comprise opening the door 130 and moving a loading ramp 140, 142 outside the storage volume via the aperture created by opening the door 130. The loading ramp 140, 142 may be placed on a surface on which the base is located, such as a floor. The pallet 152 may be placed on the loading ramp 140, 142, or on the ground or floor, and carried onto the loading ramps 140, 142. The loading ramp 140 may have a slope beginning from the ground, shown as an example at the farthest point from the sidewalls 120. This way, the pallet 152 may be carried from the ground onto the loading ramp 140.

The loading ramps 140, 142 are coupled to and maneuvered by loading arms 155 coupled to the delivery station's body, for example to the base or to a structure coupled to the base. The loading arms 155 receive power from an actuator (not shown), such as an engine. During standard operation mode, the loading ramp 140, 142 are located in a loading location inside the storage volume. When loading goods into the storage volume, the loading arms 155 may move the loading ramps 140, 142 from the loading location outside the storage volume. The loading arms 155 may move the loading ramp 140, 142 in any posture or direction desired by a person skilled in the art. Once the pallet 152 is located on the loading ramps 140, 142, the loading arms 155 move the pallet 152 and the loading ramp 140, 142 to the loading location inside the storage volume.

The delivery station may comprise a push-pull module for carrying storage devices such as pallets inside the housing. The push-pull module may also carry the packer when the collector collects the goods. Then, when loading a new storage device, or when removing a storage device from the housing, the push-pull module places the packer in a bay in the housing. Then, when preparing another order, the push-pull module moves to the bay and the packer is placed back on the push-pull module. When loading a new pallet, a push-pull module moves towards the loading location, collects the new pallet 152, and carries the new pallet 152 to a specific area inside the housing. Once the pallet is in place, the delivery station's memory updates that specific goods are located in a specific area. For example, sub-area #5 stores a total of 200 cans, of which 80 cans are diet coke, 50 cans are regular coke, and 70 cans are mineral water. This information may be received from a device operated by a person or robot that provided the pallet 152 outside the delivery station and sent a message that the pallet 152 is ready to be loaded. This information may be provided by a sensor, such as an image sensor, operating in the storage volume, using RFID, image processing techniques and the like.

Figure 2:
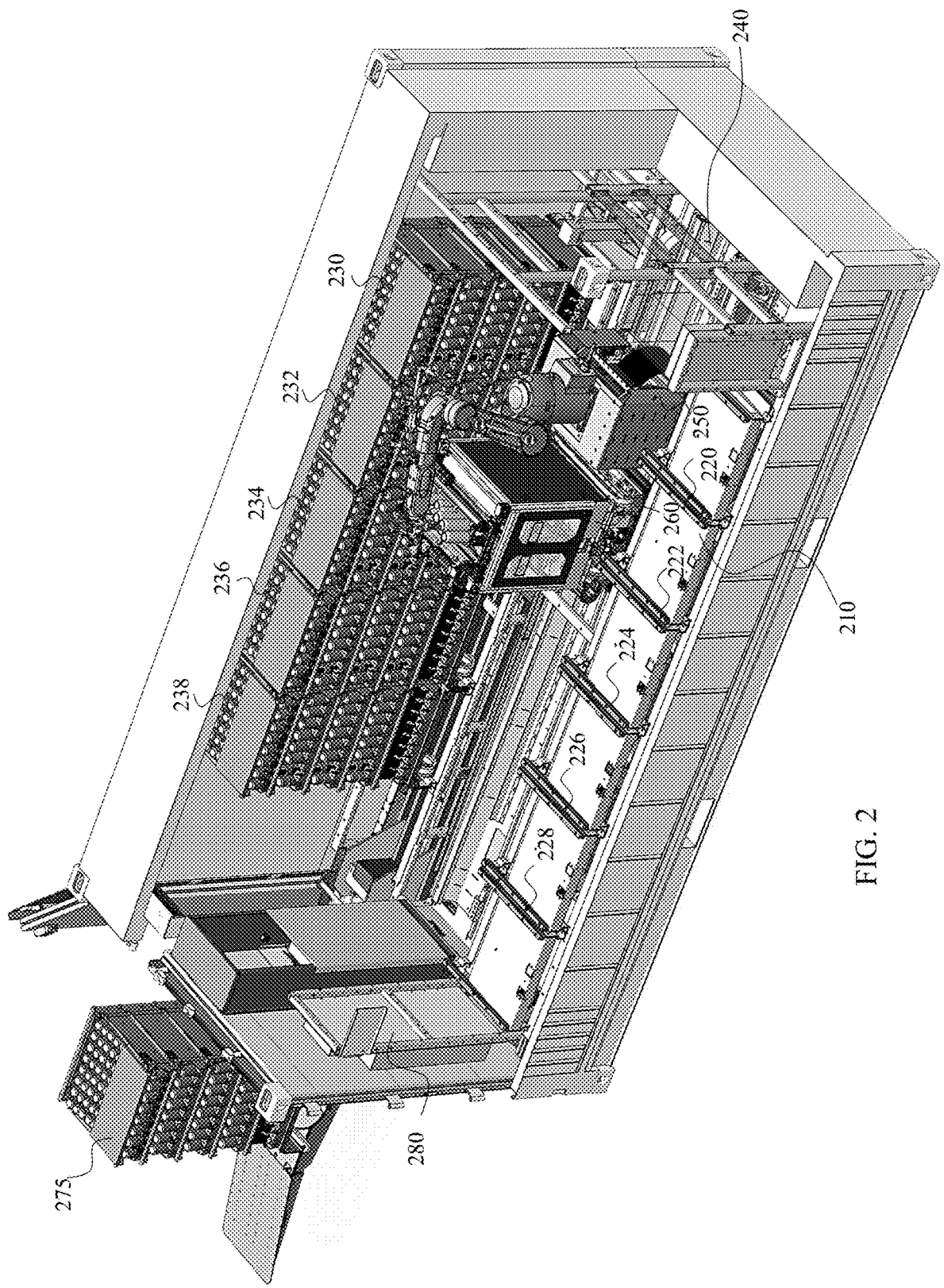
FIG. 2 shows a storage volume of the delivery station, according to an exemplary embodiment of the invention.

FIG. 2 shows a storage volume of the delivery station, according to an exemplary embodiment of the invention. The delivery station comprises a kiosk 280 for delivering the goods, side tracks 220, 222, 224, 226, 228 for sliding the storage devices into places and a storage surfaces 210 for carrying the storage devices when located in storage position. The delivery station comprises a main track 240 located along the longitudinal axis of the storage volume. The main track 240 is an exemplary embodiment of a main path over which the robots can move in the warehouse or in the delivery station. The main path may be a floor or a surface located on the floor and is uniquely adapted for movement of the robot, for example made of a specific material, having specific mechanisms such as belts and/or marks assisting the robot's navigation along the path and the like. The longitudinal axis may have one of its ends in, or close to, the aperture from which the storage devices 275 are loaded into the storage volume. This way, the storage device 275 moves along the main track 240 until reaching a desired location along the main track. The desired location may be one of the side tracks 220, 222, 224, 226, and 228. Then, the storage device 275 is pushed into one of the side tracks into the storage position. In standard operation, the storage device 275 remains in the storage position until replacing the storage device 275, for example when the storage device is empty.

In some exemplary cases, storage devices are located on both sides of the main track 240. When loaded into the storage volume, the loading arms carry the storage devices 275 to a storage device surface moving along the main track. The storage device surface may be coupled to an actuator receiving commands as to the side track that collects the storage devices 275. For example, the command may be "move the storage device to the third side track to the left". FIG. 2 also shows storage devices represented as pallets 230, 232, 234, 236, and 238 located in the storage positions on the left side of the main track 240 (left when viewed from the door 130), while the storage positions on the right side of the main track 240 are empty.

The delivery station comprises a collector 250 movable along the main track 240. The collector comprises a base coupled to the main track 240 and a collecting arm capable of collecting goods from the storage devices, such as pallets 230, 232, 234, 236, 238. The collector also 250 comprises hardware for executing commands, such as "collect goods from tray #4 in pallet #12", or a list of goods to be collected and packed as a single order to be delivered. The collector 250 may be coupled to an actuator, such as a motor, that moves the collector 250 along the main track 240. In some other cases, the main track 240 may have magnetic units that attract the collector 250 by applying a magnetic field.

The delivery station comprises a packer 260 for packing goods in a single order to be delivered via the kiosk 280. The packer 260 may move next to the collector 250, such that the collector 250 places goods collected by the collecting arm on a surface or a container of the packer 260. The packer 260 may be coupled to the collector 250 when the collector 250 collects the goods from the storage devices. Such coupling may be defined as the packer 260 being in direct physical contact with the collector 260, or that the packer 260 is placed on a movable element that is coupled to a base on which the collector 250 moves between the storage devices. When all the goods of a certain order are collected and placed on or inside the packer 260, the packer 260 packs the goods, for example by covering the goods in a bag. The bag may be sealed, or partly closed, facilitating carriage by a person. In some cases, the packer 260 may pack goods when the number of collected goods exceeds a threshold, for example, due to size or weight constraints, such as packing every 6 cans, even if the order is not completed.

Figure 3A:
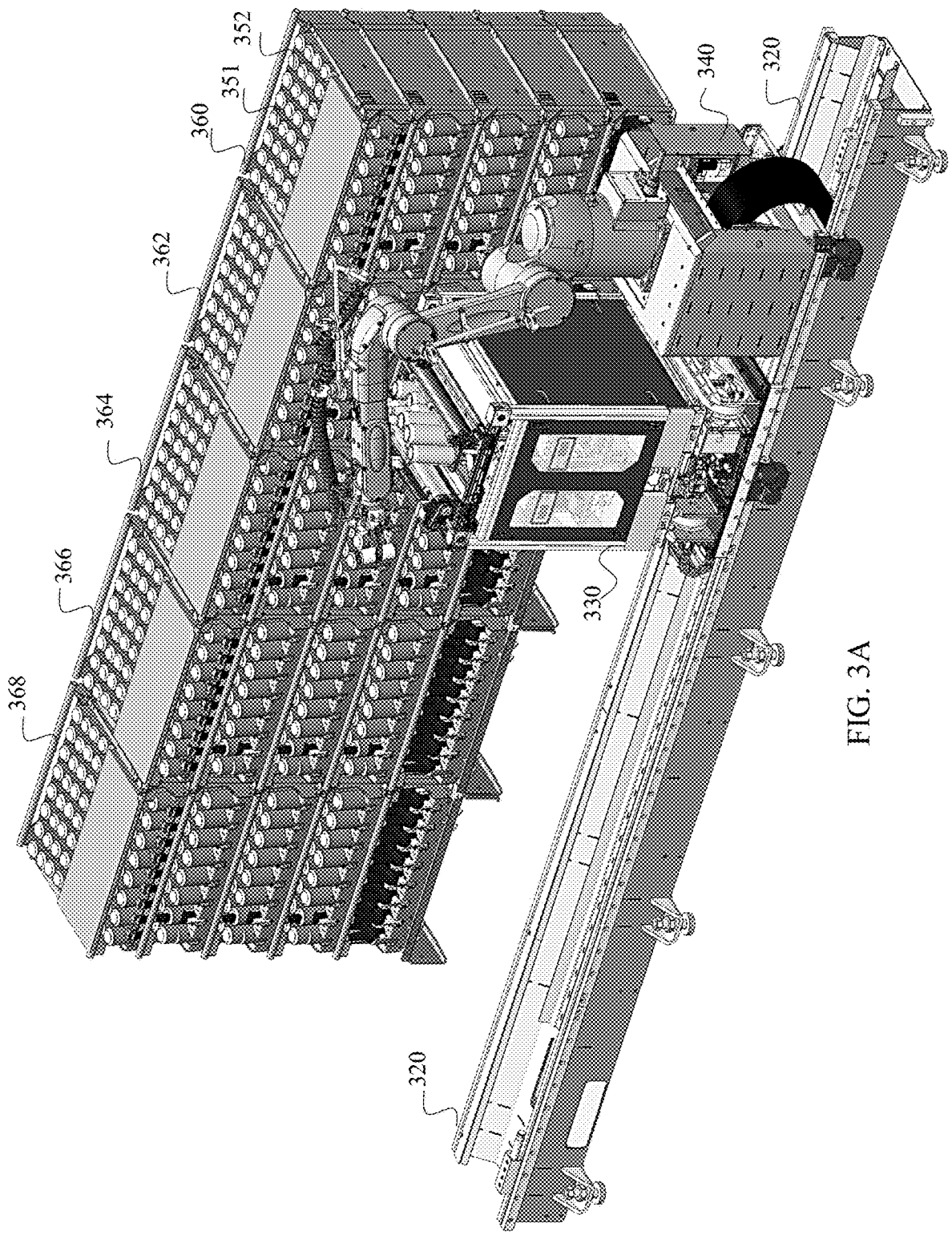
FIGS. 3A-3B show a collector collecting goods from a pallet of the delivery station, according to an exemplary embodiment of the invention.
Figure 3B:
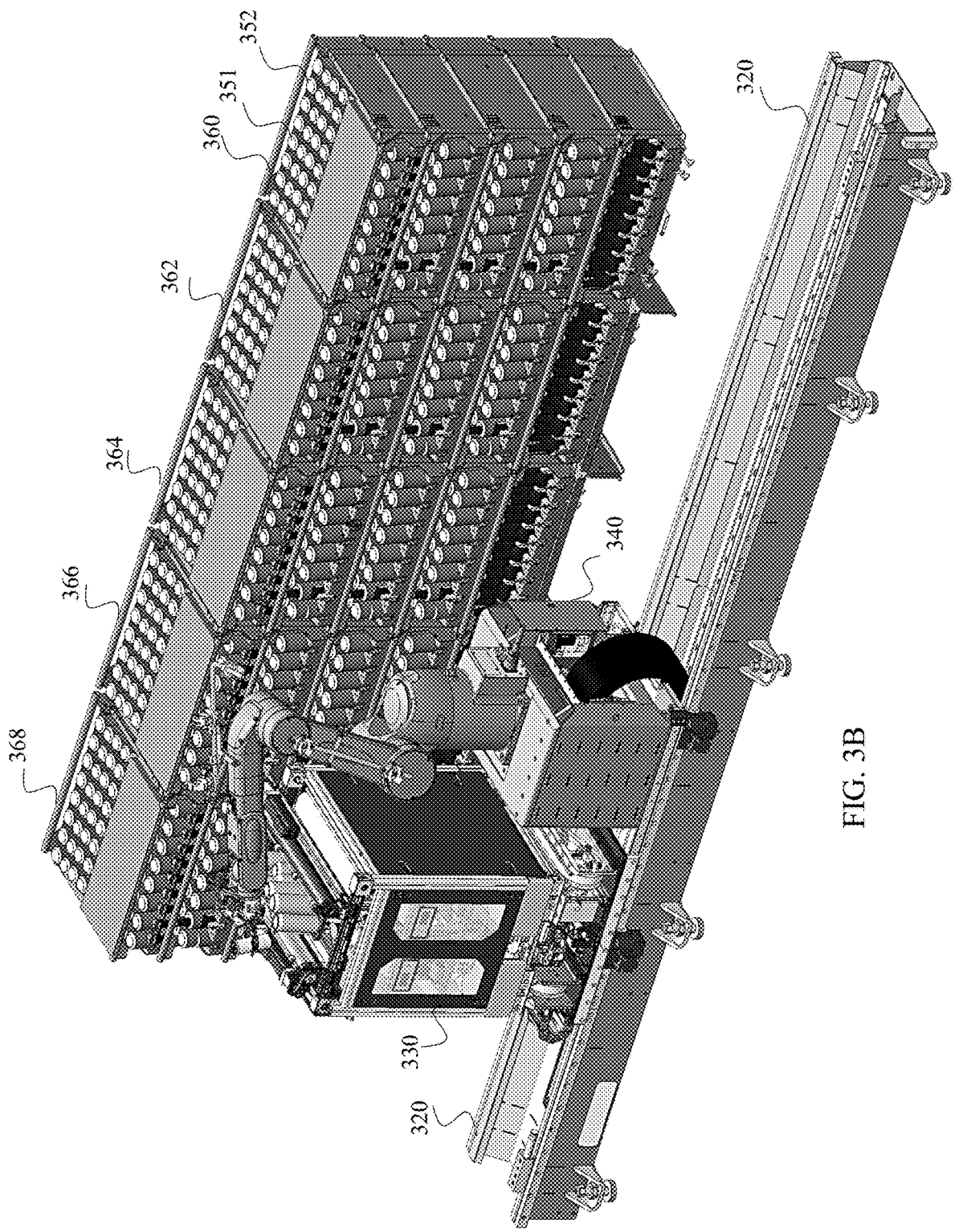

FIGS. 3A-3B show a collector collecting goods from a pallet of the delivery station, according to an exemplary embodiment of the invention.

The collector 340 and the packer 330 move along the main track 320. On one side of the main track 320 there are multiple pallets 360, 362, 364, 366, 368, each of which stores goods. The number of goods, type of goods, and location of goods in the pallets may be known to the management unit, for example, stored in a memory of the management unit, and the management unit sends commands to the collector 340 based on this information. In some other cases, the collector 340 collects items based on image recognition techniques. For example, the collector 340 receives a list of items to be collected, identifies the items in real-time from images and collects the items accordingly.

The collector 340 may collect the goods facing the main track, or goods located in other sections of the pallets which are accessible thereto, for example, the topmost section of pallets. For example, the collector 340 may collect items 351, and 352 located in a top section of pallet 360.

In FIG. 3B, the collector 340 and the packer 330 move towards pallet 368. In some cases, the size of the housing defines that there is a single main track for both the collector and the packer. In some other cases, the delivery station may comprise multiple collectors and packers traveling inside the storage volume. For example, multiple collectors may collect goods of a single order and place the goods in a single packer. In some cases, the delivery station may comprise multiple tracks, for example two tracks, one track on the right side of the housing and a second track on the left side of the housing, to enable the delivery station to produce more orders on a given time unit.

Figure 4:
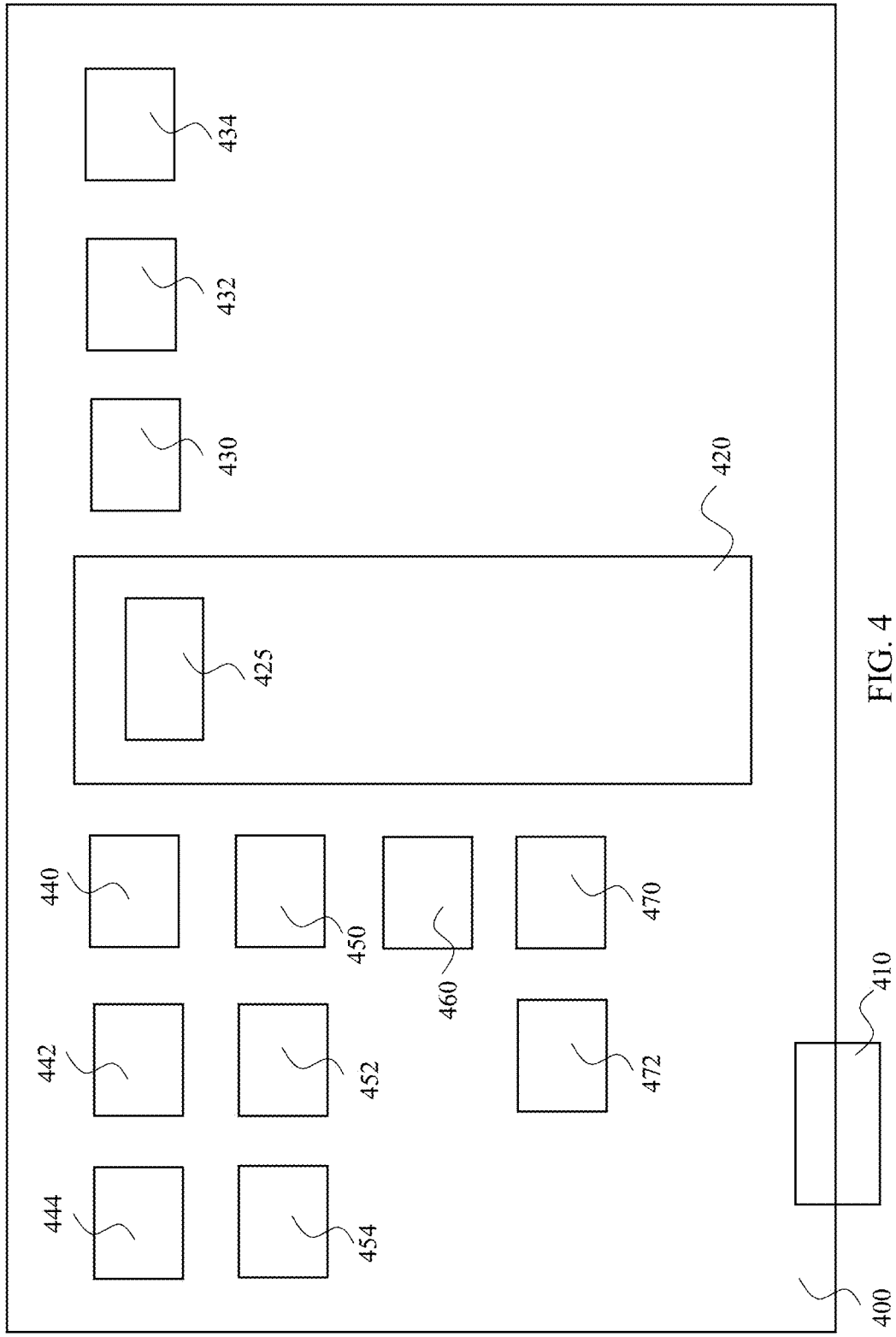
FIG. 4 shows a delivery station having multiple pallets connected in series, according to exemplary embodiments of the invention.

FIG. 4 shows a delivery station having multiple pallets connected in series, according to exemplary embodiments of the invention. Connecting in series is defined as a condition in which only one pallet of the multiple pallets is accessible to the collector. The delivery station may be surrounded by sidewalls 400, for example in case the delivery station is an autonomous store, or may be a part or section in a warehouse or store. In case the pallets are placed in a closed housing 400, the housing 400 may have a pallet opening 410 configured to enable loading and unloading the pallets from the housing. The delivery station may comprise a kiosk configured to output goods from the delivery station.

The delivery station further comprises a main track 420 configured to enable movement of the collector 425 thereon. The collector 425 comprises a base coupled to the main track 420 and a collecting arm capable of collecting goods from the storage devices, such as pallets. In some other cases, the main track 420 may have magnetic units that attract the collector 430 by applying a magnetic field. The collector 425 comprises an actuator, such as a motor or any other technique or mechanism that can move the collector 425 along the main track 420.

The delivery station comprises one or more groups of pallets connected in series. The pallets may be placed on one side of the main track 420, or on both sides of the main track 420. A first group of pallets includes pallets 430, 432 and 434, as only pallet 430 is accessible to the collector 425. The collector, or a push-pull device, can remove the accessible pallet 430, disconnect the pallet from the group of pallets and place the accessible pallet 430 on another storage volume in the delivery station. For example, the accessible pallet 430 can be disconnected from pallet 432, moved along the main track 420 and connected to pallet 460. In such a case, the collector 425 can access goods in pallet 432 but cannot longer access goods in the pallet 460.

In the exemplary case of FIG. 4, the collector 425 can access goods from pallets 430, 440, 450, 460, and 470. The collector 425 cannot access the goods in pallets 432, 434, 442, 444, 452, 454, and 472. This architecture increases the total amount of goods that can be loaded onto the delivery station on a given loading session. For example, suppose that there are six accessible pallets on each side of the main track 420, that would accumulate to 12 pallets. Connecting the pallets in series enables loading many more pallets, for example, multiply the number of accessible pallets by three, four, or any number desired by a person designing the delivery station of the invention. For example, instead of loading just 12 pallets, one can load 60 pallets during a loading session, hence reducing the number of annual loading sessions by 80 percent.

Figure 5:
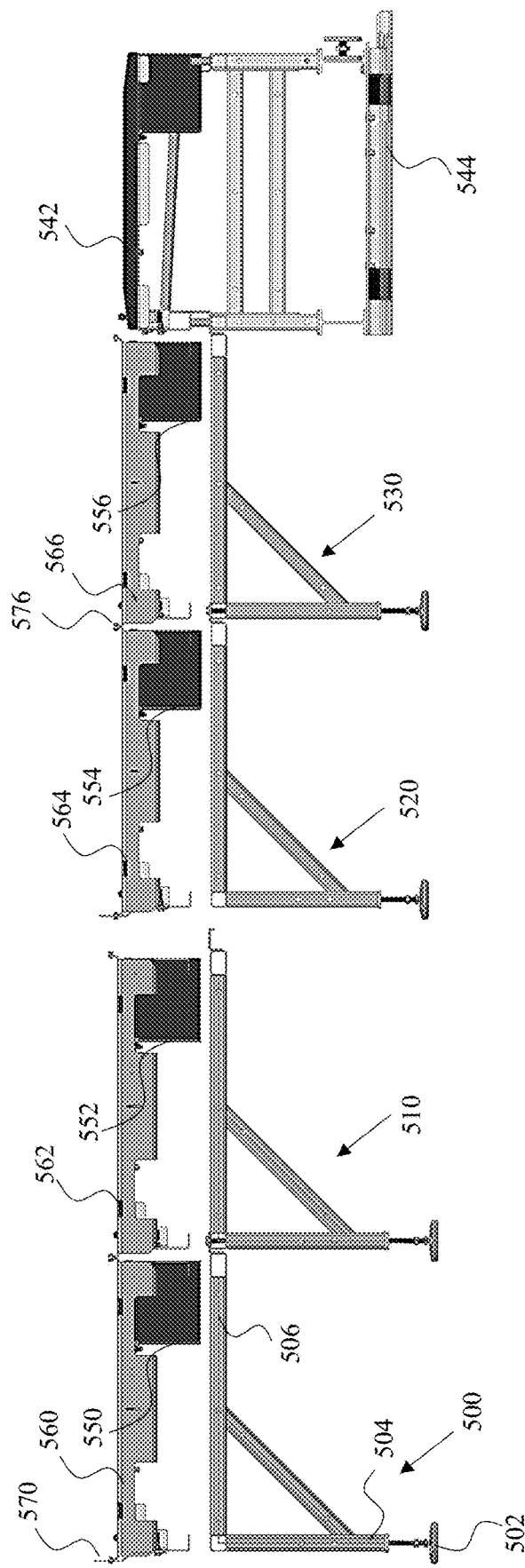
FIG. 5 shows multiple pallets connected in series on top of a pallet structure, according to exemplary embodiments of the invention.

FIG. 5 shows multiple pallets connected in series on top of a pallet structure, according to exemplary embodiments of the invention. Connection in series is defined as connection in which only a single pallet in a line of connected pallets is available to the collecting robot. The pallets are mounted on pallet stations that enable connecting new pallets thereon, for example by increasing the number of connected pallets from three to four. The pallet stations may be part of the system's infrastructure, such as subframes 500, 510, 520, and 530, or may be removable from the subframes 500, 510, 520, and 530 when assembling the system modularly. The subframes 500, 510, 520, and 530 have at least a floor interface 502 being in physical contact with a floor of the delivery station or another surface substantially parallel to the floor. The subframes 500, 510, 520, and 530 further comprise a vertical pole such as vertical pole 504 extending upwards from the floor interface 502 and a lateral pole 506 being substantially parallel to the ground. The subframes 500, 510, 520, and 530 may be connected to each other in series, as can be seen, subframes 500 and 510 are connected to each other, subframes 510 and 520 are connected to each other and subframes 520 and 530 are connected to each other. This enables modularity of delivery stations, and assembling delivery stations of various sizes, for example between two pallets connected in series to twelve pallets connected in series. The pallets 560, 562, 564, 566 slide along pallet stations 550, 552, 554, 556. The pallet stations 550, 552, 554, 556 are mounted on top of the pallet subframes 500, 510, 520, and 530. Pallet stations 542 shows a station without a pallet on top. The pallet stations can be connected to each other, to keep a constant distance between the pallet stations and verify that a pallet can move from one pallet station to another. For example, when pallet 566 is connected to pallet 564, the pallet 566 is pushed away from the main track by a pushing device that stands on the body of the autonomous system. As a result of such pushing, pallet 560 moves from pallet station 552 to pallet station 550, pallet 562 moves from pallet station 554 to pallet station 552 instead of pallet 560 and pallet 564 moves from pallet station 554 to pallet station 554 instead of pallet 562.

The pallet stations 550, 552, 554, 556 comprise connectors configured to connect the pallet stations to each other in series, in a direction perpendicular to the main track 544. For example, connector 576 connects pallet station 556 to pallet station 554. In some cases, the pallet station which is farthest from the main track has a stopper configured to limit the pallet from sliding away from the pallet station. For example, in case there is room after the farthest pallet station which is pallet station 550, the pallet station comprises a stopper 570 configured to prevent the pallet 560 from sliding down from the pallet station 550.

FIGS. 6A-6D show multiple phases of a first pallet connecting to a second pallet, according to exemplary embodiments of the invention. The first pallet 610 is first carried by a robot along the main track 600 until reaching the second pallet 620. The first pallet 610 pushes the second pallet 620 away from the main track 600, such that the second pallet 620 is not accessible to the collector after the first pallet 610 is connected to the second pallet 620. The first pallet 610 has a connecting mechanism 615 configured to secure the first pallet 610 to the second pallet 620. The connecting mechanism 615 may be a connector, a pin, a hook, or another mechanism or technique desired by a person skilled in the art. The connecting mechanism 615 may be movable relative to the first pallet 610, for example using a piston or an actuator. In some cases, the connecting mechanism 615 does not move relative to the first pallet 610, such that the robot has to move the first pallet 610 relative to the second pallet 620 in order to connect and disconnect the first pallet 610 from the second pallet 620.

Figures 6A, 6B, 6C, 6D:
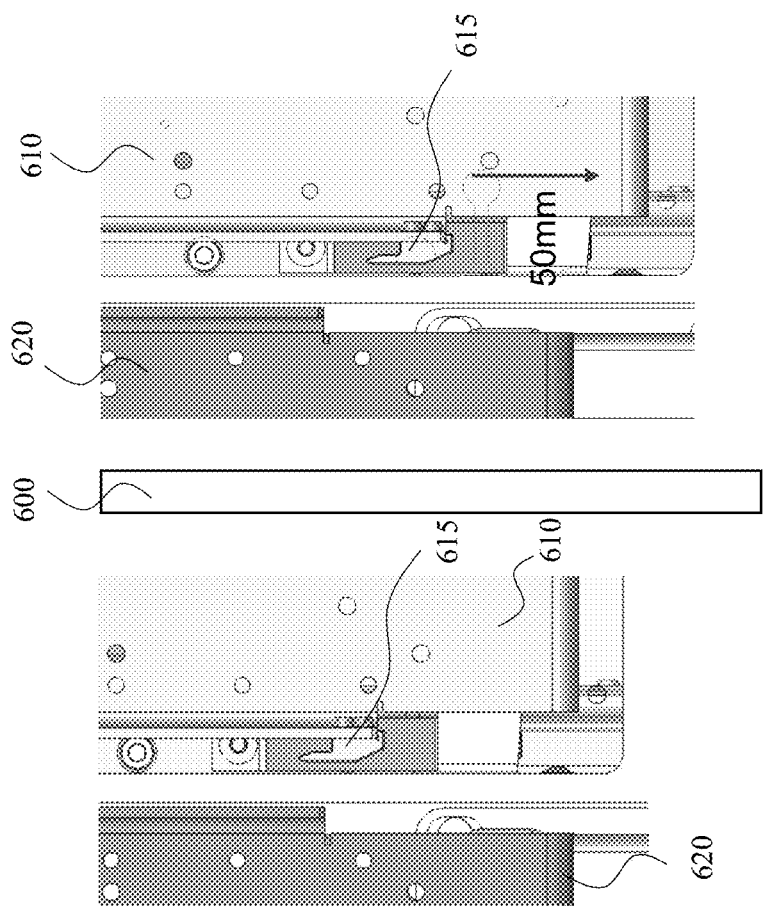
FIGS. 6A-6D show multiple phases of a first pallet connecting to a second pallet, according to exemplary embodiments of the invention.

FIG. 6A shows the first stage of the connection process, in which the first pallet 610 is positioned next to the second pallet 620. In this phase, both pallets are disconnected. FIG. 6B shows the second stage of the connection process, in which the first pallet 610 is moved relative to the second pallet 620 in order to enable the connecting mechanism 615 to slide into a matching mechanism in the second pallet. For example, the connecting mechanism 615 may be a pin and the matching mechanism may be loops, or niches in the second pallet 620 that are filled by the connecting mechanism. When there is a requirement to connect more than 2 pallets in a series, the pallets may comprise a connecting mechanism configured to connect the pallet to another pallet already located aside from the main track, and a matching mechanism configured to receive a new pallet. For example, pallet 442 uses the connecting mechanism 615 when connecting to pallet 444 and uses a matching mechanism when connecting to a pallet 440 which arrives from the main track. In this phase, both pallets are disconnected. The movement of the first pallet from the first phase to the second phase may be parallel to the longitudinal axis of the main track 600.

FIG. 6C shows a third phase of the connecting process, in which the first pallet 610 is in physical contact with the second pallet 620, but both pallets are not connected. The movement required between the second phase and the third phase may be perpendicular to the main track, on a horizontal axis. FIG. 6D shows a fourth phase of the connecting process, in which the connecting mechanism 615 of the first pallet 610 is secured to the matching mechanism 620 of the second pallet 620. For example, pins protruding from the hook are inserted into the niches of the second pallet 620.

The connecting process and the disconnecting process of pallets is designed in a manner that lacks any actuators, motors or power to be applied by a pallet. The power is applied by a robot that carries the pallet along the main track and moves the pallet to another pallet carried by one of the stations. The robot moves the pallet in a manner that fits the matching mechanism of the pallet being carried by the station.

Figure 7A:
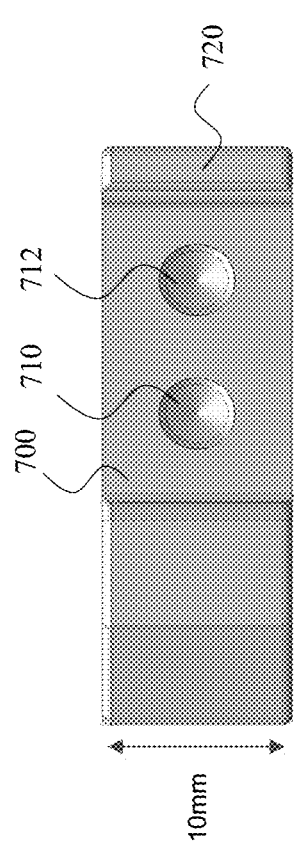
FIGS. 7A-7B show a hook used as a connecting mechanism, according to exemplary embodiments of the invention.
Figure 7B:
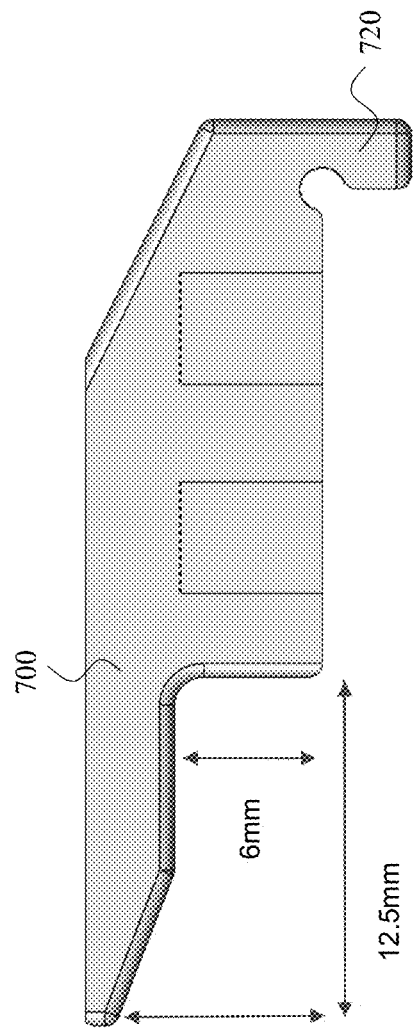

FIGS. 7A-7B show a hook used as a connecting mechanism, according to exemplary embodiments of the invention. FIG. 7A shows a bottom view of the hook, with a hook body 700 and two niches 710, 712 configured to match the protrusions of another pallet. The hook has a hook end 720 that is a wider part of the hook body 700. FIG. 7B shows a side view of the hook, showing that the hook end 720 is wider than the proximal part of the hook body 700.

Figure 8:
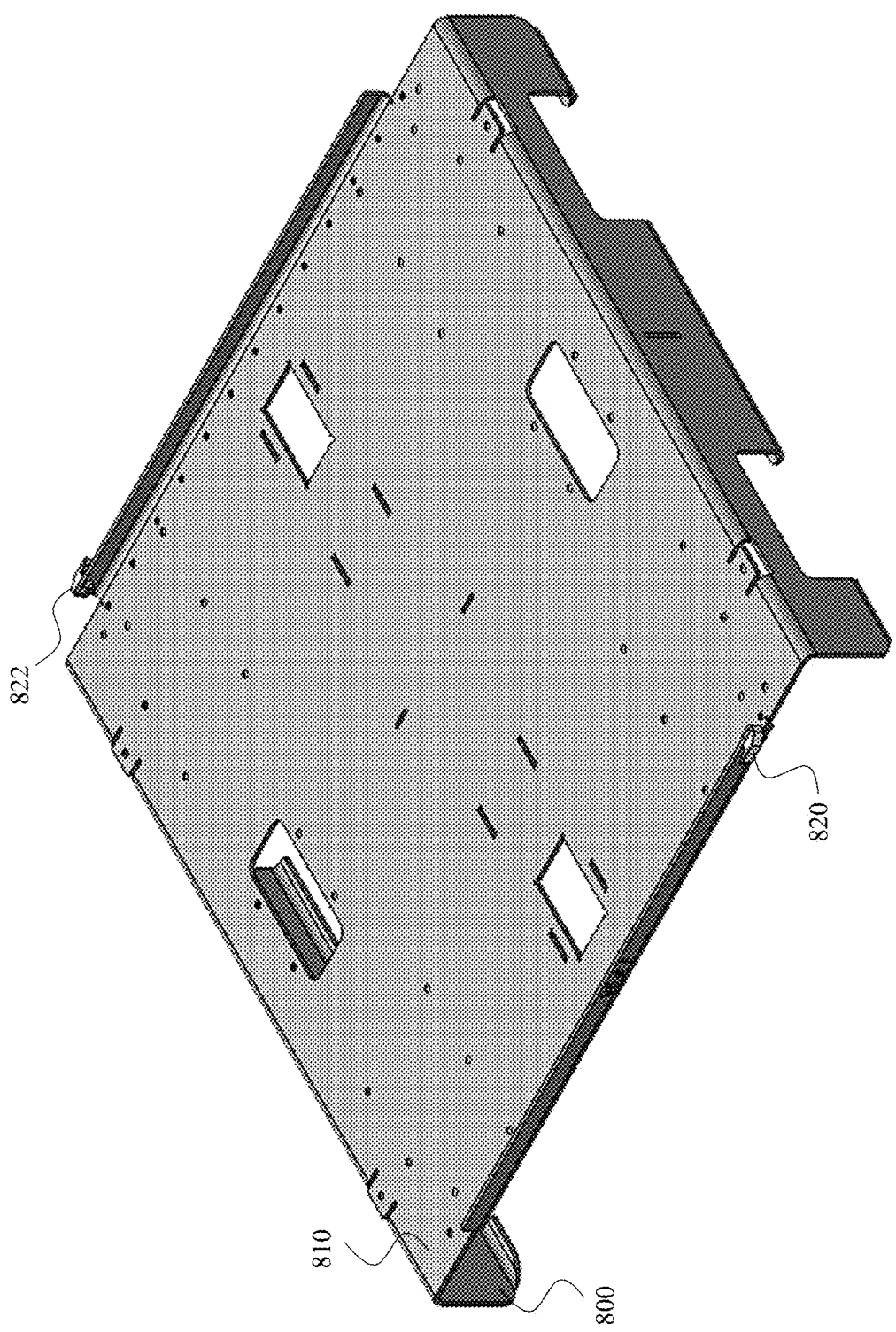
FIG. 8 shows a pallet with two connecting mechanisms, according to exemplary embodiments of the invention.

FIG. 8 shows a pallet with two connecting mechanisms, according to exemplary embodiments of the invention. The pallet comprises a pallet station 800 configured to slide over the base when pushed by the push-pull device. Storage units, such as shelves, are secured on top of the pallet body 810. The pallet body 810 is secured to a front connecting mechanism 820 and to a rear connecting mechanism 822. For example, the front connecting mechanism 820 is configured to be secured to a rear connecting mechanism of a another pallet placed farther from the main track. For example, the rear connecting mechanism 822 is configured to be secured to a front connecting mechanism of a another pallet placed closer to the main track.

While the disclosure has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the invention not be limited to the particular embodiments described herein.

What is claimed is:

1. A system for storing goods system, comprising:
a main path configured to enable movement of a robot thereon; and
multiple storage devices containing goods to be delivered,
wherein the multiple storage devices are connected in series in a direction substantially perpendicular to a longitudinal axis of the main path,
wherein the robot is configured to carry a first storage device of the storage devices along the main path until reaching a second storage device to which the first storage device is connected, and
wherein engagement of one storage device to another storage device is enabled by movement of the robot.

2. The system of claim 1, further comprising a management unit for receiving orders for goods and a kiosk for outputting the goods in the order.

3. The system of claim 1, wherein the multiple storage devices comprise a connecting mechanism configured to connect two storage devices to each other.

4. The system of claim 1, further comprising multiple pallet stations, each pallet station of the multiple pallet stations is located under a storage device of the multiple storage devices, the pallet stations are configured to carry the storage device.

5. The system of claim 4, further comprises a stopper configured to limit a sliding motion of the storage device on top of the pallet station.

6. The system of claim 1, further comprising an actuator configured to move the first storage device of the multiple storage devices relative to the second storage device when connecting the first storage device to the second storage device.

7. The system of claim 6, wherein the first pallet moves along a longitudinal axis of the main path.

8. The system of claim 1, further comprising a kiosk used by a user of the delivery station, the kiosk has an aperture that enables collecting the goods outside the housing.

* * * * *